United States Patent [19]

Kastl et al.

[11] 4,420,241

[45] Dec. 13, 1983

[54] MOUNTING ASSEMBLY FOR FILM-SQUEEZING ROLLERS

[75] Inventors: Alfons Kastl, Munich; Klaus Lehnert, Unterhaching; Horst Köninger; Güter Schirk, both of Munich, all of Fed. Rep. of Germany

[73] Assignee: Agfa-Gevaert AG, Leverkusen, Fed. Rep. of Germany

[21] Appl. No.: 424,997

[22] Filed: Sep. 27, 1982

[30] Foreign Application Priority Data

Dec. 18, 1981 [DE] Fed. Rep. of Germany ....... 3150225

[51] Int. Cl.³ .............................................. G03D 9/02
[52] U.S. Cl. ..................................... 354/319; 354/86; 354/304; 226/194; 384/428
[58] Field of Search ................... 354/86, 87, 304, 319, 354/320, 321, 322; 226/190, 194; 384/428, 439

[56] References Cited

U.S. PATENT DOCUMENTS

| | | | |
|---|---|---|---|
| 3,745,904 | 7/1973 | Bing et al. ............................. | 354/304 |
| 3,776,118 | 12/1973 | Driscoll et al. ..................... | 354/304 |
| 3,807,616 | 4/1974 | Hope et al. .......................... | 226/194 |
| 4,253,757 | 3/1981 | Friedman ............................ | 354/304 |
| 4,358,194 | 11/1982 | Krehbiel .............................. | 354/320 |
| 4,360,260 | 11/1982 | Eloranta et al. ..................... | 354/86 |

FOREIGN PATENT DOCUMENTS 2732973 10/1980 Fed. Rep. of Germany .

*Primary Examiner*—A. A. Mathews

*Attorney, Agent, or Firm*—Michael J. Striker

[57] ABSTRACT

A film-treatment device has two spaced and generally parallel mounting plates each having a pair of plate holes and respective pairs of journals in the plate holes having respective journal holes centered on a pair of journal axes. The journal holes of the plates are coaxial with each other and the two journal axes are parallel. Rollers centered on respective roller axes each have a pair of substantially cylindrical end trunnions centered on the respective roller axis and rotatably received in a respective one of the journal holes for rotation of the respective roller therein with its roller axis coaxial with the respective journal axis. The journals of one of the journal axes are constructed so the respective roller can move against spring force limitedly away from the other roller. At least one journal of each journal axis is formed at the respective journal hole with two semicylindrical journal surfaces spaced axially apart, centered on the respective journal axis, of the same radius of curvature as the respective trunnion, and diametrally oppositely concave toward each other. Thus the respective trunnion rides on the respective journal surfaces with the respective roller axis lying on the respective rotation axis. This one journal of each journal axis is formed at the respective journal hole with two generally semicylindrical skew surfaces spaced axially apart, centered on respective skew axes inclined to and intersecting the respective rotation axes, of at least the radius of curvature of the respective trunnion, and diametrally oppositely concave toward each other.

10 Claims, 2 Drawing Figures

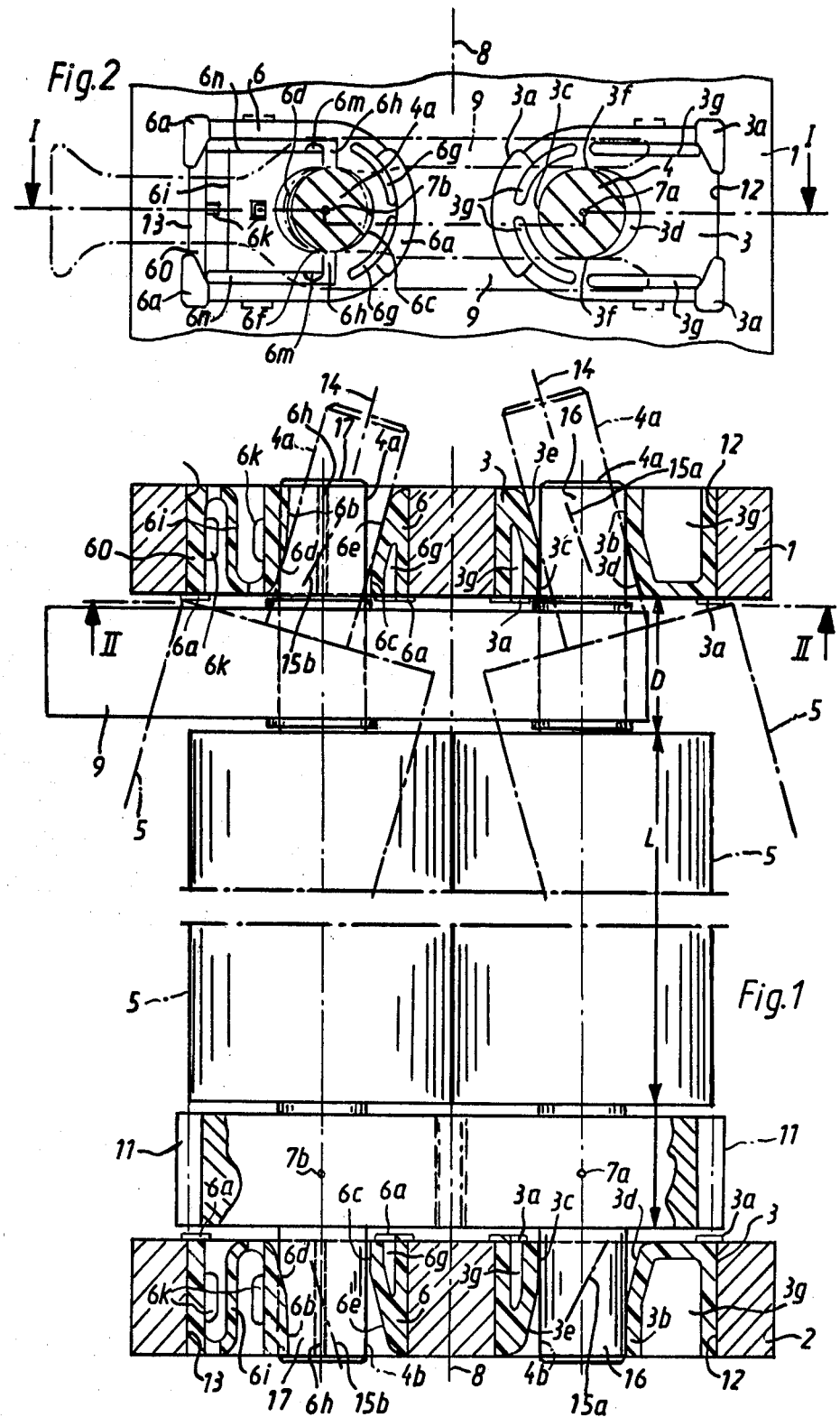

MOUNTING ASSEMBLY FOR FILM-SQUEEZING ROLLERS

FIELD OF THE INVENTION

The present invention relates to the film-transport or -squeezing rollers of film-treatment apparatus, such as in a camera that uses self-developing film. More particularly this invention concerns a journal mounting for the trunnion pins of such rollers.

BACKGROUND OF THE INVENTION

Self-developing film must be passed after exposure between a pair of transport and squeeze rollers that clench it tightly as it moves through between them. This action ruptures a capsule of developing chemicals at the leading end of the piece of film, forcing these chemicals downstream along the piece to its trailing end to initiate the self-developing process.

These rollers are cylindrical and each have at each end a coaxial small-diameter trunnion. Each trunnion fits snugly in the cylindrical hole of a respective journal that holds it snugly while permitting it to rotate freely. The journal holes of each roller are coaxial with each other and with the respective roller, and the journal two axes are parallel. The structure forming the journal holes of one of the rollers is limitedly displaceable in a direction away from the other roller, that is in the plane of the two journal axes, but is biased in this direction toward the other roller so that the rollers are biased together with the appropriate and considerable pressure, which is exerted on the film passing between these two rollers.

These rollers are subject to considerable wear. In addition they can become fouled with chemicals if something goes wrong, and it is possible for the film to jam up in the apparatus at these rollers. Thus it is necessary to take out and reinstall the rollers occasionally. This is a relatively onerous job that is normally left to a professional camera repairer, or is undertaken only by a fairly handy person. As described in German Pat. No. 2,732,973 the journals are held in place by screws which must be removed to free the rollers enough to get them out. Furthermore it is necessary to take out both rollers, even if only one needs removal.

OBJECTS OF THE INVENTION

It is therefore an object of the present invention to provide an improved mounting assembly for film-squeezing and/or -transporting rollers.

Another object is the provision of such a mounting assembly which overcomes the above-given disadvantages.

A further object is to provide a journal arrangement which allows the rollers to be removed easily, and which allows only one of the rollers to be taken out if desired.

SUMMARY OF THE INVENTION

These objects are attained according to the instant invention in a film-treatment device of the standard type, that is having two spaced and generally parallel mounting plates each having a pair of plate holes and respective pairs of journals in the plate holes having respective journal holes centered on a pair of journal axes. The journal holes of one plate are coaxial with the journal holes of the other plate and the two journal axes are parallel. Rollers centered on respective roller axes each have a pair of substantially cylindrical end trunnions centered on the respective roller axis and rotatably received in a respective one of the journal holes for rotation of the respective roller therein with its roller axis coaxial with the respective journal axis. The journals of one of the journal axes are constructed so the respective roller can move against spring force limitedly away from the other roller. According to this invention at least one journal of each journal axis is formed at the respective journal hole with two semicylindrical journal surfaces spaced axially apart, centered on the respective journal axis, of the same radius of curvature as the respective trunnion, and diametrally oppositely concave toward each other. Thus the respective trunnion rides on the respective journal surfaces with the respective roller axis lying on the respective rotation axis. In addition this one journal of each journal axis is formed at the respective journal hole with two generally semicylindrical skew surfaces spaced axially apart, centered on respective skew axes inclined to and intersecting the respective rotation axes, of at least the radius of curvature of the respective trunnion, and diametrally oppositely concave toward each other. Each of the skew surfaces is axially level relative to the respective journal axis with a respective one of the respective journal surfaces. The skew axes are each at such an angle and so positioned relative to the respective journal axes that the respective trunnions can be inserted into the respective journals in surface contact with the respective skew surfaces.

According to another feature of this invention the journal holes of the journals of the one journal axis are further formed with flat tangential and triangular surfaces extending between each edge of each skew surface and the confronting edge of the respective journal surface. The triangular surfaces are generally planar and lying in two parallel planes equidistantly flanking the journal axes. In this case the journal holes therefore appear as slots rather than circles on the faces of the mounting plates.

The journals, in accordance with another feature of this invention, are formed unitarily of a synthetic resin and with cutouts permitting limited displacement of the respective journal hole perpendicular to the respective journal axis.

In addition the journals of the one journal axis are slotted diametrally, subdividing the respective skew surfaces into inner skew and journal surfaces concave toward the other journal axis and outer skew and journal surfaces concave away from the other journal axis. The journals of the one axis are provided with a spring element urging the respective outer skew and journal surfaces toward the other journal axis. This spring element can be an S-shaped web unitarily formed in the respective journal. In such arrangement the journals of the one journal axis have stops for limiting displacement of the respective outer skew and journal surfaces away from the other axis.

To hold the journals on the plates, they are formed with tabs lying axially against the respective plates.

Although it is only strictly necessary for one of the journals of each journal axis to be formed with the skew axes, all of the journals can be formed with such skew and journal surfaces. Thus the rollers can be inserted starting with either of its respective two trunnions. To allow such mounting from outside, at the end of the journal hole closer to the other respective journal the respective journal surface is concave away from the other journal axis.

According to another feature of the invention each of the rollers has an axial length between its trunnions shorter by a predetermined distance than the axial spacing between the plates, one of the trunnions being substantially longer than this distance and the other being at most as long as this distance. This long trunnion is inserted in its journal with the roller and skew axes coaxial, then the roller is pivoted so its roller axis is coaxial with the respective journal axis, and its short trunnion is dropped into the other journal hole.

In such an arrangement, according to the invention, the rollers are prevented from slipping out of their journal holes by a clip of an axial length at most equal to the distance on each of the one long trunnions between the respective roller and the respective plate. This the clip prevents the other shorter trunnion from working out of its respective journal hole.

DESCRIPTION OF THE DRAWING

The above and other features and advantages will become more readily apparent from the following, reference being made to the accompanying drawing in which:

FIG. 1 is an axial section through the assembly of this invention; and FIG. 2 is a section taken along line II—II of FIG. 1, line I—I indicating the section plane of FIG. 1.

SPECIFIC DESCRIPTION

As seen in FIGS. 1 and 2, upper and lower substantially identical mounting plates 1 and 2 are each formed with two throughgoing D-section holes 12 and 13 receiving respective journals 3 and 6. The journals 3 have journal holes 16 aligned on an axis 7a and the journals 6 have journal holes 17 aligned on an axis 7b parallel to the axis 7a. As will be discussed in greater detail below, the journals 6 are constructed so that their axis 7b can move limitedly toward and away from the axis 7a, but is normally urged toward the other axis 7b and into the illustrated position. Respective flanges 3a and 6a of the journals 3 and 6 lie against the inner faces of the two plates 1 and 2 to hold the journals 3 and 6 in place in the respective bores 12 and 13. The other ends of the journals 3 and 6 can hook and engage somewhat elastically over the outer faces of the plates 1 and 2 at the opposite ends of the bores 12 and 13 to prevent any axial movement of these journals on the plates 1 and 2, although a force-fit as shown normally is sufficiently tight.

Two cylindrical and identical rollers 5 have upper and lower coaxial cylindrical trunnions 4a and 4b both centered on a roller axis 14. The lower trunnions 4b project down from respective identical gears 11 fixed on the respective rollers 5. The rollers 5 and gears 11 together have an axial length L which is short by a distance D of the axial spacing equal generally to (D+L) between the two plates 1 and 2. In addition each lower trunnion 4b projects down from the respective roller gear 11 by a distance shorter than the distance D, whereas each upper trunnion 4a is axially more than twice as long as the distance D. In use the two rollers 5 meet at a plane 8 that is midway between and parallel to the two axes 7a and 7b, but perpendicular to the plane including both these axes 7a and 7b. In this position the two identical gears 11 mesh, and one of them normally also meshes with a gear of a drive arrangement.

When the rollers 5 are in use position in the assembly, their axes 14 lie on the respective axes 7a and 7b and their trunnions 4a and 4b ride on respective semicylindrical journal surfaces 3b and 3c in the holes 16 and in identical such surfaces 6b and 6c in the holes 17. The journal surfaces 3b and 6b are centered on the respective axes 7a and 7b and are concave toward the plane 8. The surfaces 3c and 6c are also centered on the respective axes 7a and 7b but are concave away from the plane 8. In addition the surfaces 3b and 6b lie axially wholly outside the respective surfaces 3c and 6c. Clearly two such semicylindrical surfaces on each trunnion 4a or 4b center and journal it perfectly in the respective hole 16 or 17.

In addition each journal 3 and 6 is formed with two further inner flared skew surfaces 3d and 6d and two outer flared skew surfaces 3e and 6e. These surfaces 3d, 6d, 3e, and 6e are also semicylindrical and concave toward the respective surfaces 3c, 3b, 6c, and 6b, but are centered on skew axes 15a and 15b that intersect and form an acute angle of about 15° with the respective axes 7a and 7b, with the axes 15a and 15b meeting at the plane 8 outside the roller assembly. The radii of curvature of the surfaces 3b—3e and 6b—6e is the same and is generally equal to that of the trunnions 4a and 4b. Triangular flat tangent surfaces 3f and 6f connect the semicylindrical surfaces 3d, 3e, 6d, and 6e with the respective surfaces 3c, 3b, 6c, and 6b, these surfaces 3f and 6f being parallel to each other and perpendicular to the plane 8. Thus each of the holes 16 and 17 appears flared in one direction, inward toward each other on the outside of the assembly and outward away from each other on the inside.

In use a spacer 9 generally shaped like a fork as seen in FIG. 2 and of an axial height equal to a little less than the spacing D is fitted around the two trunnions 4a between the rollers 5 and the inner lower face of the plate 1. This prevents either roller 5 from riding axially up enough for its lower trunnion 4b to disengage from the respective journal hole 16 or 17. This clip 9 holds has hollows in its legs that align and fit with the trunnions 4a to hold them lossely and prevent the clip 9 from sliding off unless it is pulled off with sufficient force to spread its legs somewhat on the trunnions 4a.

The angle between the axes 7a and 7b and the respective axes 15a and 15b is so related to the diameter of the rollers 5, the sizes of the plates 2, and the sizes and shapes of the nearby structure that it is possible to remove either of the rollers 5 simply by pulling off the clip 9, the axially sliding the roller 5 to be removed up until its lower trunnion 4b pulls out of the respective lower journal hole 16 or 17. This action pushes the longer upper trunnion 4a up through the plate 1, above which appropriate clearance has been provided. The entire roller 14 is then tipped, with its lower trunion 4b pulled away from the plane 8 until the roller axis 14 is coaxial with the respective skew axis 15a or 15b. In this position the upper trunnion 4a is lying on either the skew surfaces 3d and 3e of the journal 3 or the skew surfaces 6d and 6e of the journal 6. In this position the roller 5 can be pulled axially down and out of the assembly, completely clearing the lower plate 2.

Inserting a new roller is done in reverse, by first poking the upper trunnion 4a into one of the upper journal bores 16 or 17, and then pivoting the entire roller 5 in and dropping its lower trunnion 4b down into the lower journal hole 16 or 17. In this regard it is noted that it is only necessary to provide journals 3 or 6 according to this invention the end of each roller 5 having the long trunnion 4a. At the other end a simple cylindrical journal hole can be provided. In order to allow upside-down mounting of the rollers 5, or simply to reduce parts, the upper and lower plates 1 and 2 can both be provided with journals 3 and 6 in whose bores 16 and 17 the trunnions can be tipped.

The journals 3 and 6 are made somewhat resilient by the provision of fissures or voids 3g and 6g in them, forming cutouts limiting wall thickness everywhere to the smae size. Such fabrication also saves plastic and makes molding the item much easier.

In addition the journals 6 are made, as mentioned above, so that the axis 7b can move against spring force away from the axis 7a. This action allows the rollers 5 to spread slightly as a film pack or the like passes between them. To this end the hole 17 is slotted diametrally parallel to the plane 8 at a slot 6h that separates the surfaces 6c and 6e on the inside from the surfaces 6b and 6d on the outside. In addition the journal 6 is formed with throughgoing slots 6n which start at the outer ends of the slot 6h and extend perpendicular away from the plane 8. An S-shaped spring web 6i from the lower end of the surface portion 6d to the outside flange 6o of the journal 6, constituting the sole support for that portion of the journal 6 forming the surfaces 6b and 6d, which therefore can move away from the axis 7a by elastic deformation of the spring web 6i which is of substantially smaller wall thickness than the rest of the journal 6. Such displacement is limited by stops 6k to either side of the central portion of the web 6i, and is guided by bumps in the slots 6m that keep the axis 7b almost perfectly parallel to the axis 7a.

The journals 3 and 6 can be made very cheaply, in fact at no greater cost than the journals now used. They can be mounted in place without tools, and allow the rollers 5 to be removed and replaced also without tools. Either roller 5 can be removed without removing the other, so that only one roller need be taken out if that is all that is necessary.

We claim:

1. In a film-treatment device having:

two spaced and generally parallel mounting plates each having a pair of plate holes, respective pairs of journals in the plate holes having respective journal holes centered on a pair of journal axes, the journal holes of one plate being coaxial with the journal holes of the other plate and the two journal axes being parallel, and rollers centered on respective roller axes and each having a pair of substantially cylindrical end trunnions centered on the respective roller axis and rotatably received in a respective one of the journal holes for rotation of the respective roller therein with its roller axis coaxial with the respective journal axis, the journals of one of the journal axes being constructed so the respective roller can move against spring force limitedly away from the other roller, the improvement wherein at least one journal of each journal axis is formed at the respective journal hole with:

two semicylindrical journal surfaces spaced axially apart, centered on the respective journal axis, of the same radius of curvature as the respective trunnion, and diametrically oppositely concave toward each other, whereby the respective trunnion rides on the respective journal surfaces with the respective roller axis lying on the respective rotation axis, and two generally semicylindrical skew surfaces spaced axially apart, centered on respective skew axes inclined to and intersecting the respective rotation axes, of at least the radius of curvature of the respective trunnion, and diametrally oppositely concave toward each other, each of the skew surfaces being axially level relative to the respective journal axis with a respective one of the respective journal surfaces, the skew axes being at such an angle and so positioned relative to the respective journal axes that the respective trunnions can be inserted into the respective journals in surface contact with the respective skew surfaces.

2. The film-device improvement defined in claim 1 wherein the journal holes of the journals of the one journal axis are further formed with flat tangential and triangular surfaces extending between each edge of each skew surface and the confronting edge of the respective journal surface, the triangular surfaces being generally planar and lying in two parallel planes equidistantly flanking the journal axes.

3. The film-device improvement defined in claim 1 wherein the journals are formed unitarily of a synthetic resin and are formed with cutouts permitting limited displacement of the respective journal hole perpendicular to the respective journal axis.

4. The film-device improvement defined in claim 1 wherein the journals of the one journal axis are slotted diametrally, subdividing the respective skew surfaces into inner skew and journal surfaces concave toward the other journal axis and outer skew and journal surfaces concave away from the other journal axis, the journals of the one axis being provided with a spring element urging the respective outer skew and journal surfaces toward the other journal axis.

5. The film-device improvement defined in claim 4, further comprising stops formed on the journals of the one journal axis for limiting displacement of the respective outer skew and journal surfaces away from the other axis.

6. The film-device improvement defined in claim 1 wherein the journals are formed with tabs lying axially against the respective plates.

7. The film-device improvement defined in claim 1 wherein all the journals are formed with such skew and journal surfaces.

8. The film-device improvement defined in claim 1 wherein at the end of the journal hole closer to the other respective journal the respective journal surface is concave away from the other journal axis.

9. The film-device improvement defined in claim 1 wherein each of the rollers has an axial length between its trunnions shorter by a predetermined distance than the axial spacing between the plates, one of the trunnions being substantially longer than this distance and the other being at most as long as this distance.

10. The film-device improvement defined in claim 9, further comprising a clip of an axial length at most equal to the distance on each of the one long trunnions between the respective roller and the respective plate, whereby the clip prevents the other shorter trunnion from working out of its respective journal hole.

* * * * *